US005631902A

United States Patent [19]
Yoshifuji

[11] Patent Number: 5,631,902
[45] Date of Patent: May 20, 1997

[54] DIGITAL CROSS-CONNECT SYSTEM

[75] Inventor: Yuuki Yoshifuji, Tokyo, Japan

[73] Assignee: NEC Corporation, Japan

[21] Appl. No.: 234,387

[22] Filed: Apr. 28, 1994

[30] Foreign Application Priority Data

Apr. 28, 1993 [JP] Japan ..................... 5-103178

[51] Int. Cl.$^6$ ..................... H04J 3/02
[52] U.S. Cl. ............ 370/388; 370/464; 340/825.8
[58] Field of Search ................. 370/58.1, 58.2, 370/58.3, 53, 54, 55, 56, 59, 63, 65.5, 77, 95.3, 112, 60, 60.1, 94.1, 94.2, 94.3; 340/825.02, 825.03, 825.79, 825.8

[56] References Cited

U.S. PATENT DOCUMENTS 5,377,182  12/1994  Monacos ................. 370/58.3

OTHER PUBLICATIONS

Clos, Charles, "A Study of Non–Blocking Switching Networks", *The Bell System Technical Journal*, vol. xxxii, No. 2, pp. 406–424, Mar. 1953, AT&T.
Kodaira, Kunio, "Optimum Multiconnection Networks which are Non–Blocking in the Wide Sense", IEICE Trans., '81/8, vol. J64–B, No. 8, pp. 839–846, Aug. 1981.

*Primary Examiner*—Douglas W. Olms
*Assistant Examiner*—Dang Ton
*Attorney, Agent, or Firm*—Ostrolenk, Faber, Gerb & Soffen, LLP

[57] ABSTRACT

A digital cross-connect system has a network management system for designating input and output terminals and delivering one-to-one connection and one-to-many branch connection request signals, and a plurality of cross-connect devices each including a multistage switch for switching connections between the input and output terminals over former, intermediate, and latter stages, and a switch control device for controlling switched connections between the input and output terminals. The network management system designates a switch in the latter stage and delivers a one-to-many connection request signal. The switch control device instructs a switch in the former stage to make a one-to-one connection only and inhibits the switch from making a one-to-many branch connection in response to the one-to-many connection request signal, and also instructs the designated switch in the latter stage to inhibit signals from being supplied from input terminals other than one designated input terminal. If the switch designated by the one-to-many connection request signal is blocked and fails to make any connections, then error information is returned from the switch control device to the network management system.

12 Claims, 5 Drawing Sheets

$220_3'$ – 12 × 12 THREE STAGE SWITCH

DIGITAL CROSS-CONNECT SYSTEM

BACKGROUND OF THE INVENTION

1. Field of the Invention

The present invention relates to a cross-connect device for use in a network for transmitting signals of high-level groups for digital communications, and more particularly to a digital cross-connect system which employs three-stage switches of the basic CLOS type and is capable of branch connections.

2. Description of the Related Art

Cross-connect devices are positioned in the hubs of a transmission network for transmitting signals of high-level groups for digital communications including time-division multiplex communications. In response to commands from a network management system which controls the connections of the entire network, the cross-connect devices switch connections between a plurality of N input signal lines and a plurality of G output signal lines at the respective hubs for thereby changing transmission routes on the network for digital communications. One conventional cross-connect device is basically composed of three switch groups, i.e., former-stage, intermediate-stage, and latter-stage switch groups, constructed by suitably combining a group of space switches (S switches) which spatially switch time slots between a plurality of multiplexed signal series, and a group of time switches (T switches) which switch the chronological sequence of one multiplexed signal series.

With such multistage connections, there may occur a condition referred to as interblocking in which any idle paths between the input signal lines and the output signal lines cannot be located because the intermediate-stage switches are blocked. One proposal to eliminate such a drawback is a multistage switch, called a CLOS-type multistage switch proposed by Charles Clos, in which the number m of intermediate-stage switches is equal to or greater than the sum of the number n of front-stage input signal lines and the number g of rear-stage output signal lines, minus 1 ($m \geq n+g-1$) ("A study of Non-Blocking Switching Networks", Bell System Technical Journal, Vol. 32, No. 2, 1953, pp. 406–424).

A CLOS-type three-stage switch for making any desired connections between a plurality of N input signal lines and a plurality of G output signal lines, which is said to have a switch size N×G, comprises a primary switch group of N/n switches to which divisions, each composed of n input lines, of N input lines are connected, a tertiary switch group of G/g switches to which divisions, each composed of g output lines, of G output lines are connected, and a secondary switch group of m switches interconnecting the primary and tertiary switch groups, where n and g are integers equal to or smaller than N and G, respectively, and if the values N/n and G/g are not integers, then they represent immediately higher integers. Each of the switches of the primary group has a switch size n×m, each of the switches of the secondary group has a switch size (N/n)×(G/g), and each of the switches of the tertiary group has a switch size m×g.

A j-th output terminal of the i-th primary switch is connected to an i-th input terminal of the j-th secondary switch, and a q-th input terminal of the p-th tertiary switch is connected to a p-th output terminal of the q-th secondary switch.

A five-stage switch may be handled as a three-stage switch composed of a primary switch group, a switch block group, and a quintic switch group, the switch block group comprising a CLOS-type three-stage switch group which replaces secondary, tertiary, and quartic switch groups in the intermediate stage. Similarly, switches of more odd-numbered stages may be obtained by replacing intermediate-stage switch groups with a CLOS-type three-stage switch group.

A five-stage switch having a switch size N×G comprises a primary switch group of N/n switches having a switch size n×m, a quintic switch group of G/g switches having a switch size m×g, and a switch block group of m switch blocks having a switch size (N/n)×(G/g). A j-th output terminal of the i-th primary switch is connected to an i-th input terminal of the j-th secondary switch, and a q-th input terminal of the p-th quintic switch is connected to a p-th output terminal of the q-th switch block.

The intermediate-stage switch block group has an overall switch size N'×G' where N'×G' is rewritten from (N/n)×(G/g) and N'=N/n, G'=G/g. Each switch block comprises a secondary switch group of N'/n' switches having a switch size n'×m', a tertiary switch group of m' switches having a switch size (N'/n')×(G'/g'), and a quartic switch group of G'/g' switches having a switch size m'×g'. A j'-th output terminal of the i'-th secondary switch is connected to an i'-th input terminal of the j'-th tertiary switch, and a q'-th input terminal of the p'-th quartic switch is connected to a p'-th output terminal of the q'-th tertiary switch.

The input and output signal lines may be connected in either a one-to-one connection configuration in which one input line and one output line are interconnected or a one-to-many branch connection configuration in which one input line is branched and connected to a plurality of output lines. The conventional CLOS-type cross-connect devices operate only in the one-to-one connection configuration, and there have not been available any conventional cross-connect devices operating in the one-to-many branch connection configuration.

The cross-connect devices which operate only in the one-to-one connection configuration may be used principally for circuit switching to select and connect any desired circuit. In addition, they may also be used to switch between transmission routes to keep a substitute transmission path for efficient operation of the network in the event of a failure of a transmission path.

Those of the cross-connect devices operating in the one-to-many branch connection configuration which are capable of one-to-two branch connections may be used as transmission route switching means for branching one signal into two signals at the transmission side of a transmission line, delivering the signals along respective different paths, and selecting one of the signals that has been received under better conditions at the reception side of the transmission line. This process is called patching and rolling, and can shorten the time required for transmission path switching because signals are transmitted simultaneously along two paths.

The cross-connect devices which operate in the one-to-many branch connection configuration may be used in situations where one signal is to be transmitted simultaneously to a number of locations.

The conventional cross-connect devices that employ a multistage switch having a switch size N×G are, however, disadvantageous in that accidental blocking cannot be prevented from happening in cases where one input signal is branched into a plurality of k output signals and thereafter branch connections or one-to-one connections are made in one device.

SUMMARY OF THE INVENTION

It is therefore an object of the present invention to provide a digital cross-connect system which is capable of preventing accidental blocking from occurring in cases where one input signal is branched into a plurality of output signals and thereafter one-to-one connections or one-to-many branch connections are made in one device.

According to the present invention, there is provided a digital cross-connect system for insertion in a transmission path for transmitting digital signals of high-level groups, comprising a plurality of cross-connect devices each composed of multistage switch means having a plurality of input terminals for being supplied with a plurality of digital signals from the transmission path and a plurality of output terminals for outputting digital signals to the transmission path, for switching connections between the input and output terminals over at least front, intermediate and rear stages, and switch control means responsive to connection request signals for controlling switched connections effected by the multistage switch means between the input and output terminals, and a network management system for applying a one-to-one connection request signal to make a one-to-one connection between the input and output terminals and a one-to-many branch connection request signal to branch and output a digital signal supplied to one of the input terminals to a plurality of output terminals, to each of the cross-connect devices for controlling route switching on the transmission path, the network management system comprising means for designating input and output terminals and delivering one-to-one connection and one-to-many branch connection request signals, means for designating switch means in the rear stage of the multistage switch means with respect to the one-to-many connection request signal, the switch control means comprising means for instructing switch means in the front stage of the multistage switch means to make a one-to-one connection only and inhibiting the switch means from making a one-to-many branch connection in response to the one-to-many connection request signal, and means for instructing the designated switch means in the latter stage of the multistage switch means to inhibit signals from being supplied from input terminals other than one designated input terminal.

The switch control means may further comprise means for returning error information from the switch control means to the network management system if the switch means designated by the one-to-many connection request signal is blocked and fails to make any connections.

With the arrangement of the digital cross-connect system according to the present invention, since branch connections of a switch group in the front stage of the multistage switch means, i.e., branch connections of a primary switch group of a three-stage switch or branch connections of primary and secondary switch groups of a five-stage switch, are inhibited from occurring, blocking is prevented from occurring in cases where one input signal is branched into a plurality of output signals and one-to-one connections are to be made.

The output terminals of a final-stage switch group of the multistage switch means which effects one-to-many branch connections with respect to one input signal are inhibited from being supplied with other input signals. For example, if the multistage switch means comprises a three-stage switch, then the output terminals of one tertiary switch which makes branch connections with respect to one input signal are inhibited from being supplied with other input signals. Therefore, blocking is prevented from occurring in cases where one-to-one connections or one-to-many branch connections are to be made to a cross-connect device which is making branch connections.

If the multistage switch means comprises a five-stage switch with a broadcast group established therein, then quintic switches belonging to a broadcast subgroup to which signals branched from one input signal are outputted are prevented from being supplied with other input signals. Accordingly, blocking is prevented from occurring in the same manner as with the three-stage switch arrangement.

If a branch connection request from the network management system cannot be executed due to blocking, then error information is returned to the network management system. When this takes place, therefore, the branch connection request may be altered.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
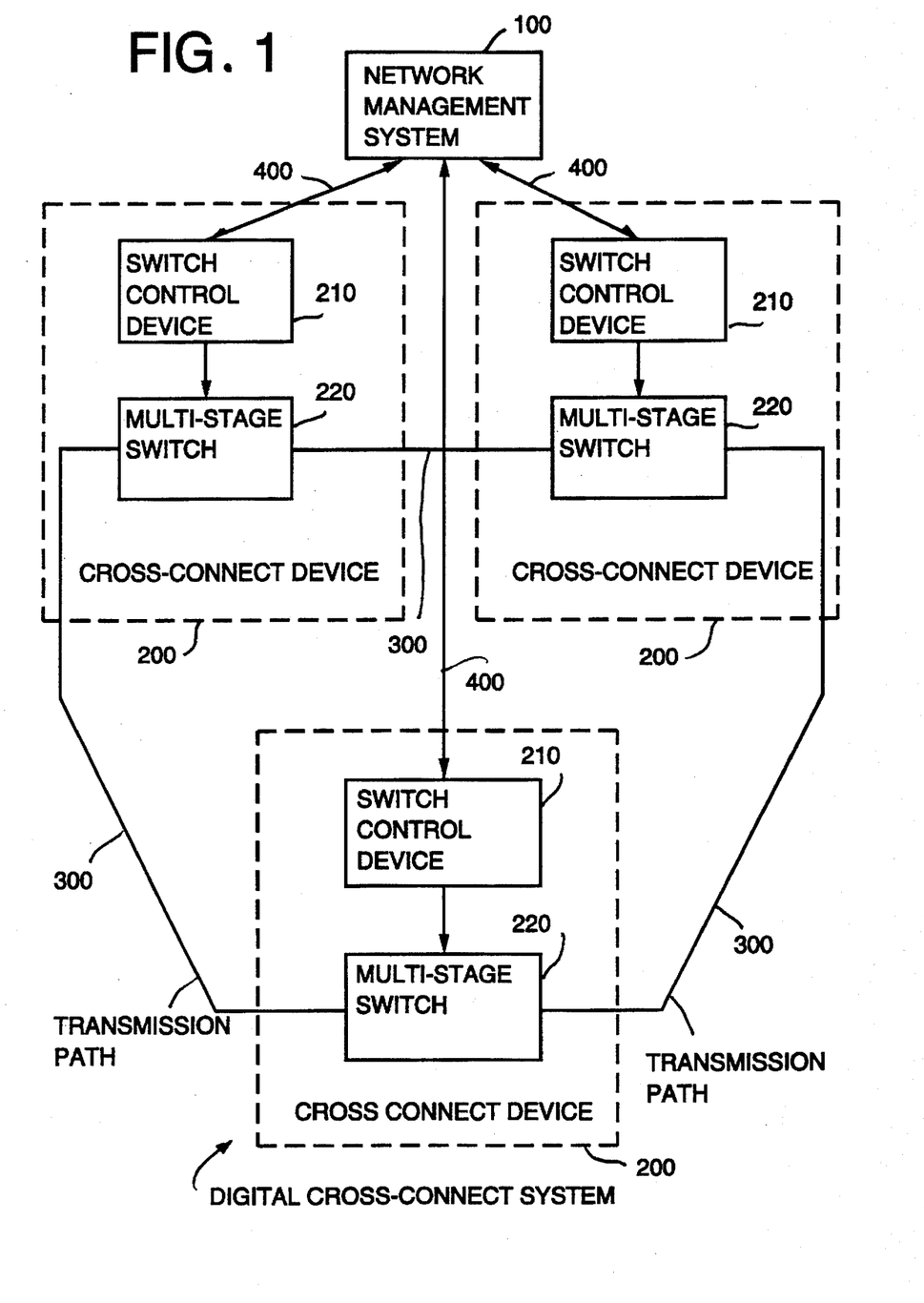
FIG. 1 is a block diagram of a digital cross-connect system having three cross-connect devices according to the present invention.

As shown in FIG. 1, a digital cross-connect system according to the present invention comprises three cross-connect devices 200 interconnected by a transmission path 30 for transmitting signals of high-level groups, and a network management system 100 for issuing a connection request signal which indicates input and output terminals and requests one-to-one and one-to-many branch connections, and a connection request signal which indicates rear-stage switch means and requests one-to-many branch connections. Each of the cross-connect devices 200 comprises a multistage switch 220 for interconnecting desired input and output terminals and a switch control device 210 responsive to a one-to-many branch connection request signal for instructing front-stage switch means to effect one-to-one connections only and inhibit one-to-many branch connections and instructing indicated front-stage switch means to inhibit connections from input terminals other than an indicated one input terminal, with the result that the switch control device 210 can control connections in the multistage switch 220 under connection requests from the network management system 100.

Figure 2:
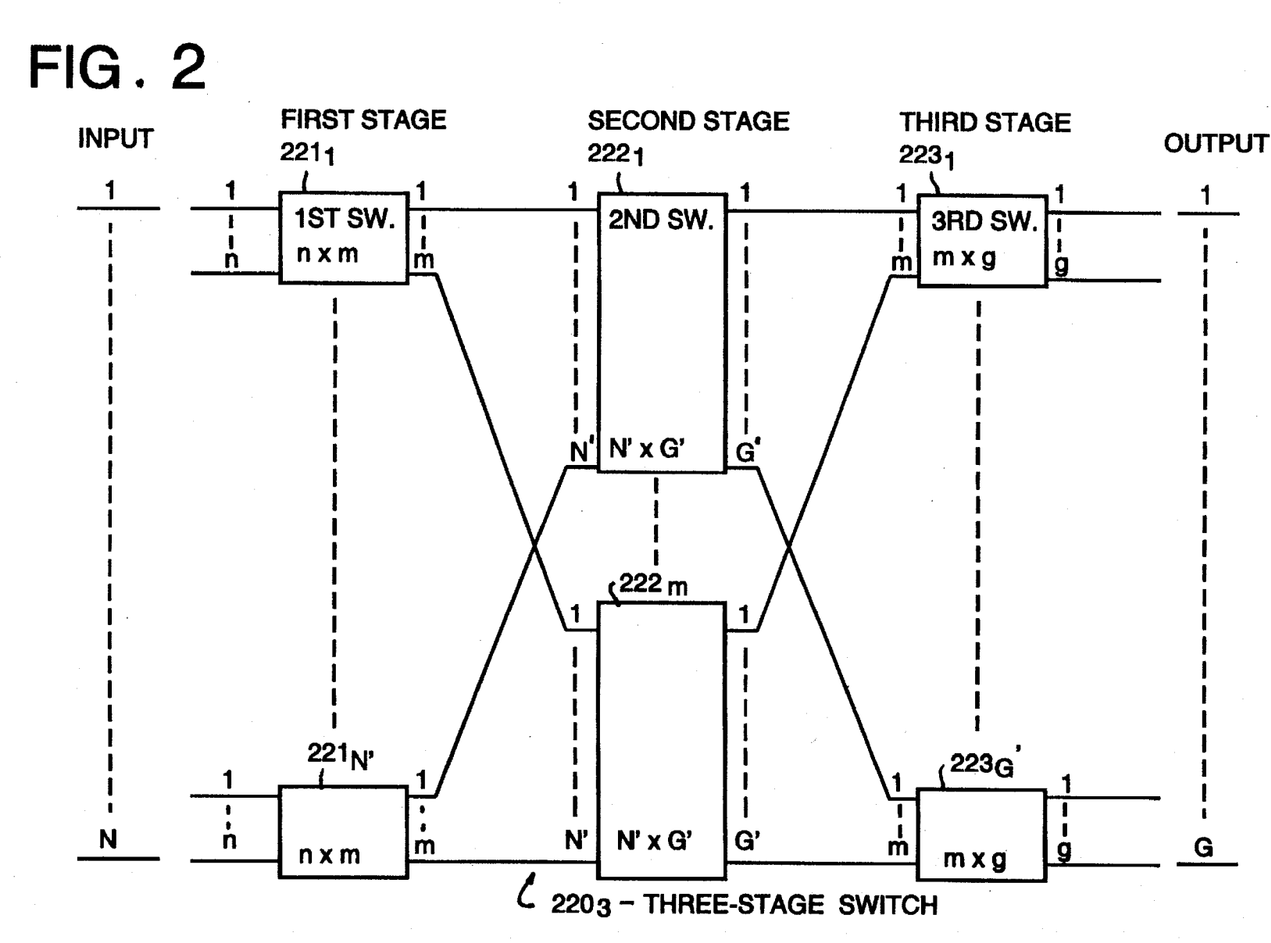
FIG. 2 is a block diagram of a multistage switch comprising a CLOS-type three-stage switch having a switch size $N \times G$ in the cross-connect system shown in FIG. 1.

In FIGS. 1 and 2, the network management system 100 has means for outputting a branch connection request to branch and send an input signal to output terminals of one tertiary switch 223 of a three-stage switch $220_3$, and means for inhibiting other input signals from being sent to output terminals of the tertiary switch 223.

Each of the switch control devices 210 comprises means for inhibiting a primary switch of the three-stage switch $220_3$ from branching and sending input signals, means for controlling the three-stage switch $220_3$ to branch and send input signals based on a branch connection request outputted from the network management system 100, and means for returning error information in the event that the branch connection request is blocked and cannot be executed.

Figure 3:
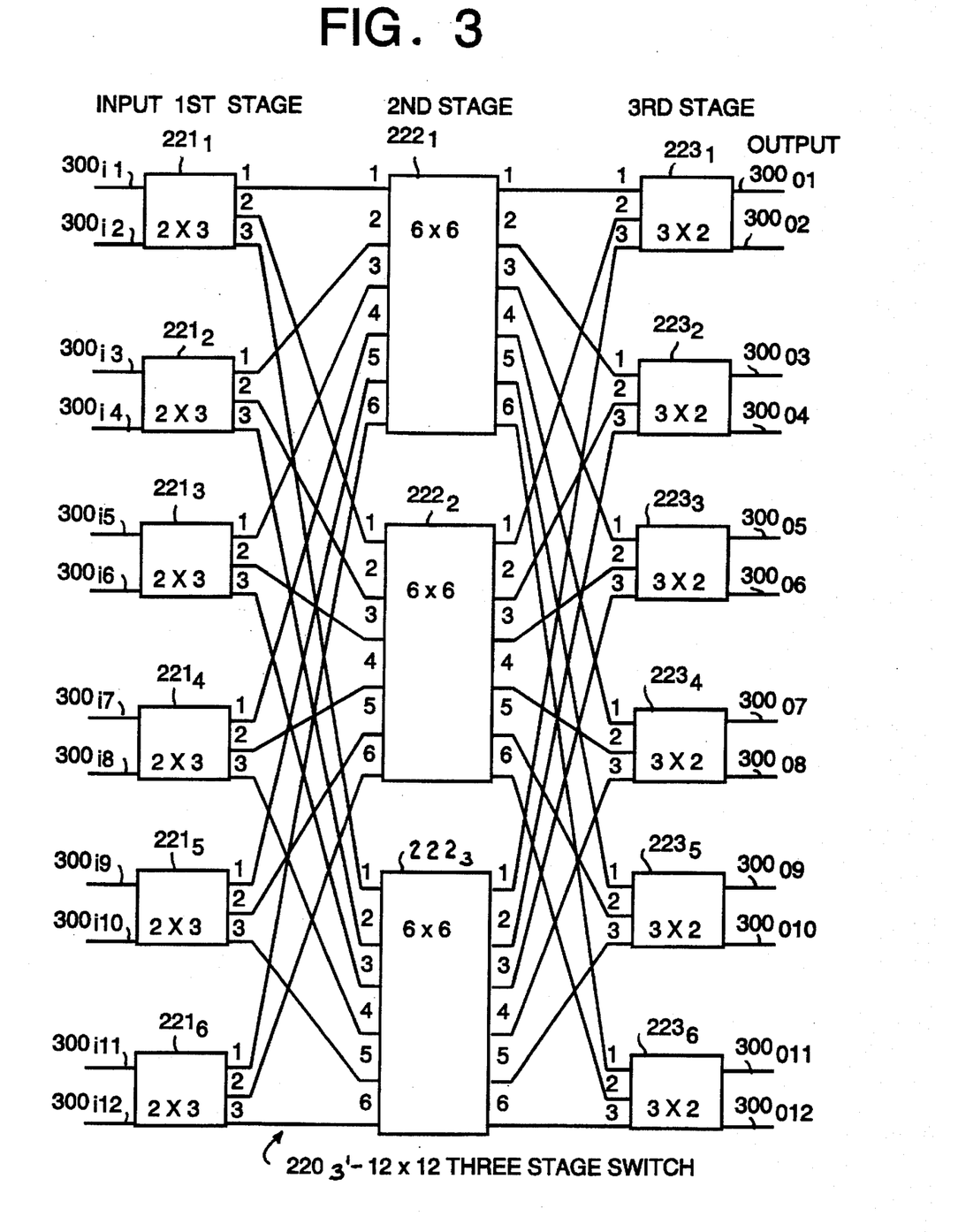
FIG. 3 is a block diagram of a CLOS-type three-stage switch having a switch size $12 \times 12$ and three secondary switches according to a specific embodiment of the cross-connect system shown in FIG. 1.

Operation of the digital cross-connect system will be described below with reference to FIG. 3, which shows a specific embodiment.

To interconnect one certain input terminal and one certain output terminal, three paths that are available in the illustrated arrangement are designated successively in the ascending order of the numbers of secondary switches.

According to a conventional system, to interconnect an input terminal which is supplied with an input signal $300i_1$ and an output terminal which outputs an output signal $300o_1$, a first secondary switch $222_1$ is selected, a primary switch $221_1$ sends an input signal $300i_1$ inputted from its input terminal 1 through an output terminal 1 thereof to an input terminal 1 of the secondary switch $222_1$, which sends the supplied signal through its output terminal 1 to an input terminal 1 of a tertiary switch $223_1$. The tertiary switch $223_1$ then outputs the signal as an output signal $300o_1$ from its output terminal.

To interconnect an input terminal which is supplied with an input signal $300i_2$ and an output terminal which outputs an output signal $300o_2$, since the secondary switch $222_1$ is being occupied, a second secondary switch $222_2$ is selected and sends the signal in a similar manner. Similarly, the secondary switch $222_1$ is selected to interconnect an input terminal which is supplied with an input signal $300i_3$ and an output terminal which outputs an output signal $300o_3$, and the secondary switch $222_2$ is selected to interconnect an input terminal which is supplied with an input signal $300i_4$ and an output terminal which outputs an output signal $300o_5$.

If the connection between the input terminal which is supplied with the input signal $300i_3$ and the output terminal which outputs the output signal $300o_3$ through the secondary switch $222_1$ is broken, and the input terminal which is supplied with the input signal $300i_3$ and an output terminal which outputs an output signal $300o_6$ are to be interconnected, a secondary switch $222_3$ is selected.

When the input terminal which is supplied with the input signal $300i_1$ is to be connected to the output terminal which outputs the output signal $300o_2$ as well as to the output terminal which outputs the output signal $300o_1$, such a branch connection is blocked because the secondary switch $222_1$ and the tertiary switch $223_1$ are in use.

According to the digital cross-connect system of the present invention, output terminals to which branch connections are to be made are designated in advance. For example, the input terminal which is supplied with the input signal $300i_1$ is branched and connected to the output terminals which output the output signals $300o_1$, $300o_2$, and the output terminal which outputs the output signal $300o_2$, being dedicated for a one-to-one connection, is not used. Therefore, a circuit or a device which is connected to the input terminal which is supplied with the input signal $300i_2$ is connected to an input terminal which is supplied with an input signal $300i_8$, and a device connected to the output terminal which outputs the output signal $300o_2$ is connected to an output terminal which outputs an output signal $300o_8$.

The input terminal which is supplied with the input signal $300i_1$ is connected to the output terminal which outputs the output signal $300o_1$ through the secondary switch $222_1$. The input terminal which is supplied with the input signal $300i_8$ is connected to the output terminal which outputs the output signal $300o_8$ through the secondary switch $222_1$. The input terminal which is supplied with the input signal $300i_3$ is connected to the output terminal which outputs the output signal $300o_3$ through the secondary switch $222_1$. The input terminal which is supplied with the input signal $300i_4$ is connected to the output terminal which outputs the output signal $300o_5$ through the secondary switch $222_2$.

If the connection between the input terminal which is supplied with the input signal $300i_3$ and the output terminal which outputs the output signal $300o_3$ through the secondary switch $222_1$ is broken, and the input terminal which is supplied with the input signal $300i_3$ and the output terminal which outputs the output signal $300o_6$ are to be interconnected, then they are connected through the secondary switch $222_3$.

With such connections made, branch connections to be made next from the input terminal which is supplied with the input signal $300i_1$ to the output terminals which output the output signals $300o_1$, $300o_2$ will not be blocked.

Figure 4:
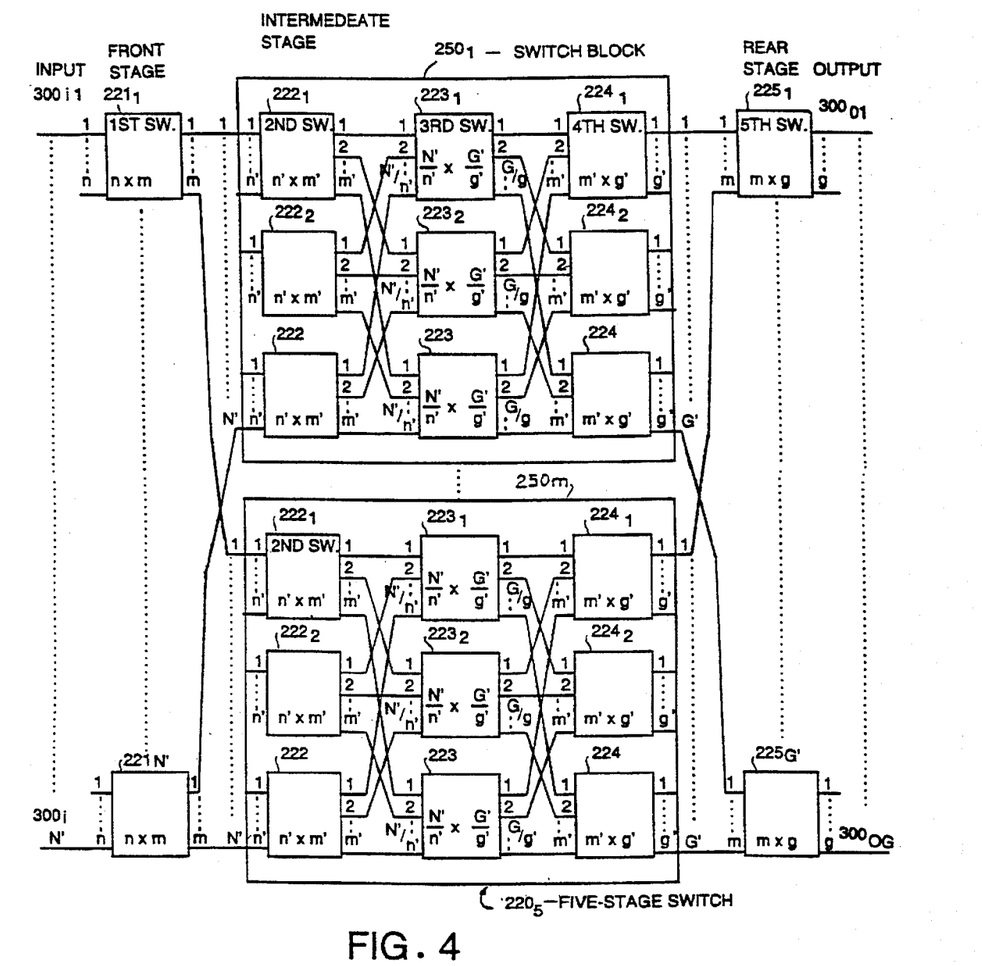
FIG. 4 is a block diagram of an intermediate-stage switch group comprising a CLOS-type five-stage switch composed of m switch blocks having a switch size $N' \times G'$ according to another embodiment of the present invention.

Another embodiment in which a CLOS-type five-stage switch having a switch size 12×12 will be described below with reference to FIGS. 4 and 5.

In the five-stage switch, branch connections between primary and secondary switches are inhibited from being made. g'×g output terminals of a quintic switch connected to one quartic switch belong to a broadcast group, g output terminals of one quintic switch belong to a broadcast subgroup, and all c (c is one of 2 through G) output terminals Bx (x is one of 1 through c) branched from A (A is one of 1 through N) input signals belong to one broadcast group. Output terminals which do not belong to the output terminals Bx are inhibited from being connected to the broadcast group to which the output terminals Bx belong.

Figure 5:
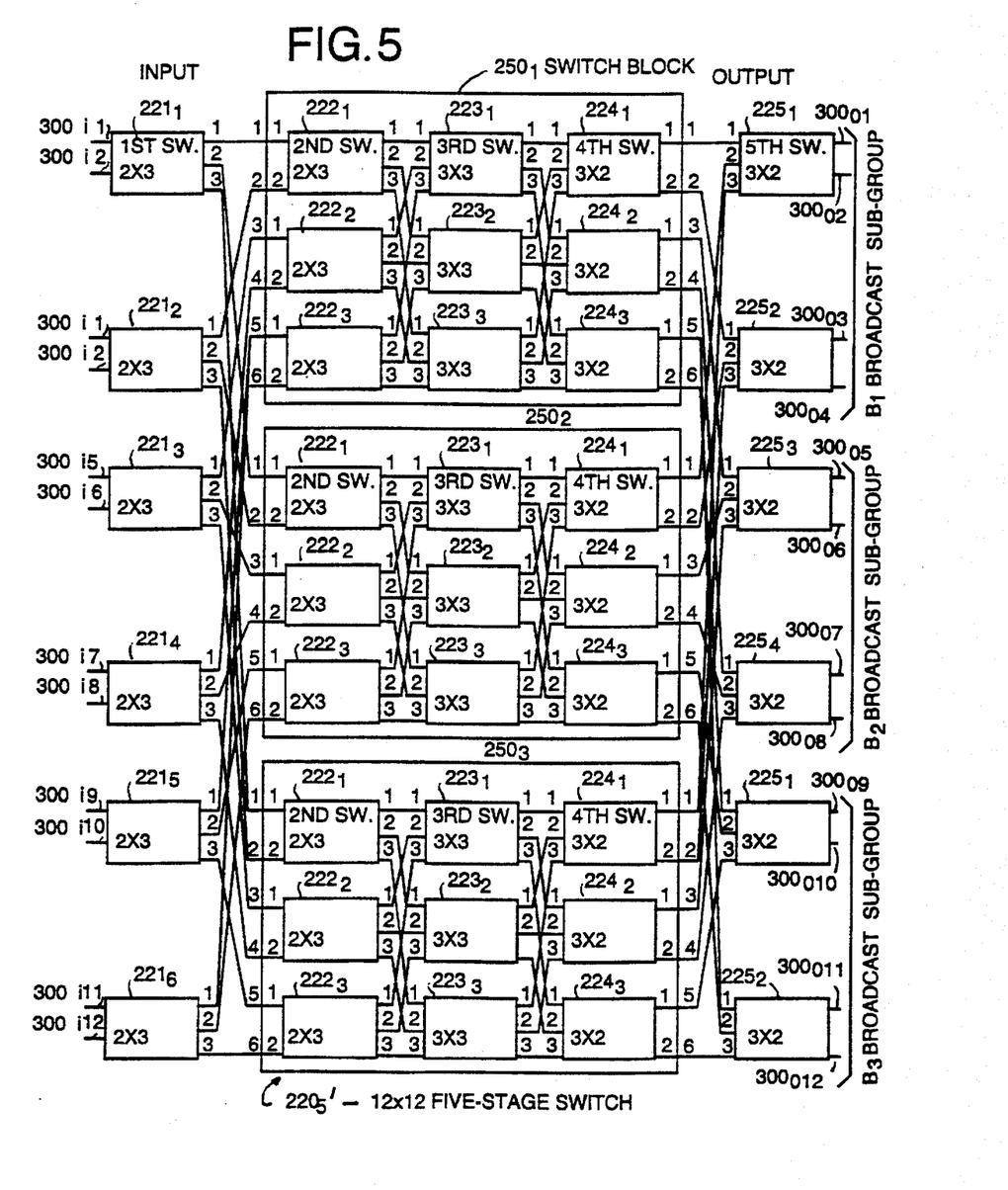
FIG. 5 is a block diagram of a CLOS-type five-stage switch having three switch blocks.

In the arrangement shown in FIG. 5, output terminals which output output signals $300o_1$~$300o_{12}$ are in six broadcast groups, with each range of the output terminals which output output signals $300o_1$~$300o_4$, output signals $300o_5$~$300o_8$, and output signals $300o_9$~$300o_{12}$ being in two broadcast subgroups.

In the five-stage switch, nine paths are available for interconnecting one input terminal and one output terminal, and switch blocks and tertiary switches that are used to interconnect the terminals are selected which have the smallest possible numbers.

For example, an input terminal which is supplied with an input signal $300i_1$ is connected to an output terminal which outputs an output signal $300o_1$ through a switch block $250_1$ and a tertiary switch $223_1$. An input terminal which is supplied with an input signal $300i_2$ is connected to an output terminal which outputs an output signal $300o_7$ through a switch block $250_2$ and the tertiary switch $223_1$. An input terminal which is supplied with an input signal $300i_3$ is connected to an output terminal which outputs an output signal $300o_3$ through the switch block $250_1$ and a tertiary switch $223_2$. An input terminal which is supplied with an input signal $300i_4$ is connected to an output terminal which outputs an output signal $300o_5$ through the switch block $250_2$ and the tertiary switch $223_2$.

The connection between the input terminal which is supplied with the input signal $300i_2$ and the output terminal which outputs the output signal $300o_7$ through the switch block $250_2$ and the tertiary switch $223_1$ is broken, and the input terminal which is supplied with the input signal $300i_2$ is connected to an output terminal which outputs an output signal $300o_6$ through a switch block $250_3$ and the tertiary switch $223_1$.

In such a connection configuration, branch connections to be made next between the input terminal which is supplied with the input signal $300i_1$ and an output terminal which outputs an output signal $300o_4$ are blocked.

In the embodiment shown in FIG. 5, output terminals to which branch connections are to be made are designated in advance. For example, if the input terminal which is supplied with the input signal $300i_1$ is branched and connected to the output terminals which output the output signals $300o_1 \sim 300o_4$, then the input signal $300i_1$ is sent to the output terminals which output the output signals $300o_1$, $300i_4$. The output terminal which outputs the output signal $300o_3$ is not dedicated for a one-to-one connection because it belongs to a broadcast group. Therefore, a device to be connected to the input terminal which is supplied with the input signal $300i_1$ is connected to an input terminal which is supplied with an input signal $300i_8$, and a device to be connected to the output terminal which outputs the output signal $300o_3$ is connected to an output terminal which outputs an output signal $300o_8$.

In FIG. 5, therefore, the input terminal which is supplied with the input signal $300i_1$ is connected to the output terminal which outputs the output signal $300o_1$ through the switch block $250_1$ and the tertiary switch $223_1$. The input terminal which is supplied with the input signal $300i_2$ is connected to the output terminal which outputs the output signal $300o_7$ through the switch block $250_2$ and the tertiary switch $223_1$. The input terminal which is supplied with the input signal $300i_8$ is connected to the output terminal which outputs the output signal $300o_8$ through the switch block $250_2$ and the tertiary switch $223_2$. The input terminal which is supplied with the input signal $300i_4$ is connected to the output terminal which outputs the output signal $300o_5$ through the switch block $250_1$ and the tertiary switch $223_2$.

With such connections, when the connection between the input terminal which is supplied with the input signal $300i_2$ and the output terminal which outputs the output signal $300o_7$ through the switch block $250_2$ and the tertiary switch $223_1$ is broken, and the input terminal which is supplied with the input signal $300i_2$ is connected to the output terminal which outputs the output signal $300o_6$ through the switch block $250_3$ and the tertiary switch $223_1$, the branch connections between input terminal which is supplied with the input signal $300i_1$ and the output terminal which outputs the output signal $300o_4$ are not broken.

It is to be understood that variations and modifications of certain preferred embodiments disclosed herein will be evident to those skilled in the art. It is intended that all such modifications and variations be included within the scope of the appended claims.

What is claimed is:

1. A method of controlling connections in a digital cross-connect system for insertion in a transmission path for transmitting digital signals of high-level groups, the digital cross-connect system including a plurality of cross-connect devices each composed of multistage switch means having a plurality of input terminals for being supplied with a plurality of digital signals from the transmission path and a plurality of output terminals for outputting digital signals to the transmission path, for switching connections between said input and output terminals over at least front, intermediate and rear stages, and switch control means responsive to connection request signals for controlling switched connections effected by said multistage switch means between said input and output terminals, and a network management system for applying a one-to-one connection request signal to make a one-to-one connection between said input and output terminals and a one-to-many branch connection request signal to branch and output a digital signal supplied to one of said input terminals to said plurality of output terminals, to each of said cross-connect devices for controlling route switching on said transmission path, said method comprising the steps of:

designating input and output terminals and delivering one-to-one connection and one-to-many branch connection request signals;

designating switch means in the rear stage of said multistage switch means with respect to the one-to-many connection request signal;

instructing switch means in the front stage of said multistage switch means to make a one-to-one connection only and inhibiting the switch means from making a one-to-many branch connection in response to the one-to-many connection request signal; and instructing the designated switch means in the rear stage of said multistage switch means to inhibit signals from being supplied from input terminals other than one designated input terminal.

2. A method according to claim 1, further comprising the step of:

returning error information from said switch control means to said network management system if the switch means designated by the one-to-many connection request signal is blocked and fails to make any connections.

3. A digital cross-connect system for insertion in a transmission path for transmitting digital signals of high-level groups, comprising:

a plurality of cross-connect devices each composed of multistage switch means having a plurality of input terminals for being supplied with a plurality of digital signals from the transmission path and a plurality of output terminals for outputting digital signals to the transmission path, for switching connections between said input and output terminals over at least front, intermediate and rear stages, and switch control means responsive to connection request signals for controlling switched connections effected by said multistage switch means between said input and output terminals; and a network management system for applying a one-to-one connection request signal to make a one-to-one connection between said input and output terminals and a one-to-many branch connection request signal to branch and output a digital signal supplied to one of said input terminals to said plurality of output terminals, to each of said cross-connect devices for controlling route switching on said transmission path;

said network management system comprising:

means for designating input and output terminals and delivering one-to-one connection and one-to-many branch connection request signals; and means for designating switch means in the rear stage of said multistage switch means with respect to the one-to-many connection request signal;

said switch control means comprising:

means for instructing switch means in the front stage of said multistage switch means to make a one-to-one connection only and inhibiting the switch means from making a one-to-many branch connection in response to the one-to-many connection request signal; and means for instructing the designated switch means in the rear stage of said multistage switch means to inhibit signals from being supplied from input terminals other than one designated input terminal.

4. A digital cross-connect system according to claim 3, wherein said switch control means further comprises means for returning error information from said switch control means to said network management system if the switch means designated by the one-to-many connection request signal is blocked and fails to make any connections.

5. A digital cross-connect system according to claim 4, wherein said multistage switch means comprises primary, secondary, and tertiary switch groups, said switch control means comprising means for inhibiting each switch of said primary switch group from making a one-to-many branch connection with respect to an input signal supplied thereto, and inhibiting one switch of said tertiary switch group from being supplied with other input signals than a designated input signal.

6. A digital cross-connect system according to claim 4, wherein said multistage switch means comprises primary, secondary, tertiary, quartic, and quintic switch groups, said switch control means comprising means for inhibiting each switch of said primary and secondary switch groups from making a one-to-many branch connection with respect to an input signal supplied thereto, and means for designating output terminals of one switch of said quartic switch group as belonging to a broadcast group and output terminals of each switch of said quintic switch group which is connected to said one switch as belonging to a broadcast subgroup, said network management system comprising means for designating one switch of said quartic switch group and delivering a one-to-many branch connection request signal, and means for inhibiting an output terminal of each switch of said quintic switch group designated as belonging to said broadcast subgroup from being supplied with input signals other than a designated input signal.

7. A method of controlling connections in a digital cross-connect system for insertion in a transmission path for transmitting digital signal of high-level groups, the digital cross-connect system including a plurality of cross-connect devices each composed of a multistage switch having a plurality of input terminals for being supplied with a plurality of digital signals from the transmission path and a plurality of output terminals for outputting digital signals to the transmission path, for switching connections between said input and output terminals over at least front, intermediate and rear stages, and switch control device responsive to connection request signals for controlling switched connections effected by said multistage switch between said input and output terminals, and a network management system for applying a one-to-one connection request signal to make a one-to-one connection between said input and output terminals and a one-to-many branch connection request signal to branch and output a digital signal supplied to one of said input terminals to said plurality of output terminals, to each of said cross-connect devices for controlling route switching on said transmission path, said method comprising the steps of:

designating input and output terminals and delivering one-to-one connection and one-to-many branch connection request signals;

designating a switch in the rear stage of said multistage switch with respect to the one-to-many connection request signal;

instructing a switch in the front stage of said multistage switch to make a one-to-one connection only and inhibiting the switch from making a one-to-many branch connection in response to the one-to-many connection request signal; and instructing the designated switch in the rear stage of said multistage switch to inhibit signals from being supplied from input terminals other than one designated input terminal.

8. A method according to claim 1, further comprising the step of:

returning error information from said switch control device to said network management system if the switch designated by the one-to-many connection request signal is blocked and fails to make any connections.

9. A digital cross-connect system for insertion in a transmission path for transmitting digital signals of high-level groups, comprising:

a plurality of cross-connect devices each composed of a multistage switch having a plurality of input terminals for being supplied with a plurality of digital signals from the transmission path and a plurality of output terminals for outputting digital signals to the transmission path, for switching connections between said input and output terminals over at least front, intermediate and rear stages, and switch control device responsive to connection request signals for controlling switched connections effected by said multistage switch between said input and output terminals; and a network management system for applying a one-to-one connection request signal to make a one-to-one connection between said input and output terminals and a one-to-many branch connection request signal to branch and output a digital signal supplied to one of said input terminals to said plurality of output terminals, to each of said cross-connect devices for controlling route switching on said transmission path;

said network management system comprising:

means for designating input and output terminals and delivering one-to-one connection and one-to-many branch connection request signals; and means for designating a switch in the rear stage of said multistage switch with respect to the one-to-many connection request signal;

said switch control device comprising:

means for instructing a switch in the front stage of said multistage switch to make a one-to-one connection only and inhibiting the switch from making a one-to-many branch connection in response to the one-to-many connection request signal; and means for instructing the designated switch in the rear stage of said multistage switch to inhibit signals from being supplied from input terminals other than one designated input terminal.

10. A digital cross-connect system according to claim 9, wherein said switch control device further comprises means for returning error information from said switch control device to said network management system if the switch designated by the one-to-many connection request signal is blocked and fails to make any connections.

11. A digital cross-connect system according to claim 10, wherein said multistage switch comprises primary, secondary, and tertiary switch groups, said switch control device comprising means for inhibiting each switch of said primary switch group from making a one-to-many branch connection with respect to an input signal supplied thereto, and inhibiting one switch of said tertiary switch group from being supplied with other input signals than a designated input signal.

12. A digital cross-connect system according to claim 10, wherein said multistage switch comprises primary, secondary, tertiary, quartic, and quintic switch groups, said switch control device comprising means for inhibiting each switch of said primary and secondary switch groups from making a one-to-many branch connection with respect to an input signal supplied thereto, and means for designating output terminals of one switch of said quartic switch group as belonging to a broadcast group and output terminals of each switch of said quintic switch group which is connected to said one switch as belonging to a broadcast subgroup, said network management system comprising means for designating one switch of said quartic switch group and delivering a one-to-many branch connection request signal, and means for inhibiting an output terminal of each switch of said quintic switch group designated as belonging to said broadcast subgroup from being supplied with input signals other than a designated input signal.

\* \* \* \* \*